United States Patent
Abbott, Jr. et al.

[11] 3,783,271
[45] Jan. 1, 1974

[54] RADIATION TRACKING SYSTEM

[75] Inventors: Edward A. Abbott, Jr., Granada Hills; David I. Blanchard, Los Angeles, both of Calif.

[73] Assignee: Hughes Aircraft Company, Culver City, Calif.

[22] Filed: Sept. 27, 1971

[21] Appl. No.: 183,970

[52] U.S. Cl......... 250/203 R, 250/83.3 H, 250/209, 356/152
[51] Int. Cl. ............................................. G01j 1/20
[58] Field of Search .................. 250/203 R, 83.3 R, 250/83.3 H, 220 M, 208, 209; 356/4, 152

[56] References Cited
UNITED STATES PATENTS

| | | | |
|---|---|---|---|
| 3,640,628 | 2/1972 | Jones | 356/152 |
| 3,555,285 | 1/1971 | Irving | 250/220 M |
| 3,638,025 | 1/1972 | Dishington | 250/203 R |
| 3,657,547 | 4/1972 | Mansfield | 250/203 R |
| 3,609,374 | 9/1971 | Gevas | 250/203 R |
| 3,564,257 | 2/1971 | Berry | 250/203 R |
| 3,481,467 | 12/1969 | Wood | 250/223 X B |

*Primary Examiner*—Walter Stolwein
*Attorney*—W. H. MacAllister, Jr. et al.

[57] ABSTRACT

A tracking system including a staggered array of radiation detectors for use with a telescope wherein the configuration of the array, the geometry of sweep of the array, and the electronics connected to the elements of the array are combined to produce control signals adapted to be used to point the optical axis of the telescope at the geometrical centroid of all signals, above a predetermined amplitude, within the field of view of the apparatus.

21 Claims, 12 Drawing Figures

RADIATION TRACKING SYSTEM

BACKGROUND OF THE INVENTION

This invention relates to an improved radiation sensing target tracking system of the type described, for example, in U.S. Pat. No. 3,622,788; 3,640,628; and 3,644,043.

When tracking a target, such as a missile or jet aircraft, the exhaust of the missile or aircraft, frequently called the plume, is hotter than the aircraft or missile itself. Typical prior art infra-red trackers track the intensity centroid or center of intensity of radiation of the target. Error signals typically are produced by multiplying the intensity of each increment of radiation within a field of view by its distance from the optical axis. The intensity-distance products are then summed. The sum is then divided by the area of the target to obtain the intensity centroid position relative to the optical axis of the telescope.

Alternatively, the sum of the product signals are divided by the field of view of the telescope, which is a constant. Since the field of view is a constant, the division may be dispensed with and the summed signal merely scaled to a convenient scale factor.

In other tracking embodiments, the telescope is merely servoed to the brightest or most intense radiation point.

It may be seen that with the plume having a more intense radiation than the missile or aircraft, the telescope is actually servoed to position its optical axis off of the desired target and onto the plume. While this may be very satisfying to those who desire that the missile or aircraft not be tracked, it is disappointing to those who desire accurate tracking.

BRIEF DESCRIPTION OF THE INVENTION

The apparatus of this invention is adapted accurately to track a target from a long range, where the target appears as a point source of radiation, up to a close range where the target appears as an extended source of radiation. To that end, the telescope may, if desired, have both a large and small field of view for accurate tracking at both long and short ranges. Alternatively, the field of view may be made small by selectively gating the electronics of the apparatus.

The apparatus uses a multiple array of sensing elements in which, although the invention is not limited to the use of this material, the elements are preferably made of photovoltaic indium antimonide. The detector configuration is a line of detector elements comprising two multiple element arrays, arranged substantially colinearly, to sense the extent of the target area in one dimension. Sensing in a direction perpendicular to the line of the array of elements is achieved by sweeping the field of view across the line in a direction perpendicular to the line. The arrays of sensing elements each have an even number of substantially identical, substantially rectangular elements symmetrically positioned relative to the center of the line. The first array of elements comprises a plurality of small elements, called a fine track array, positioned adjacent the center of the line of elements. The second, or coarse track, array comprises a plurality of larger or more "coarse-grained" elements. It is divided in half, and it is positioned exterior to the fine track array with one-half of the elements on each end of the fine track array.

In a preferred embodiment the sensing elements are aligned perpendicular to the direction of scan of the telescope. The sensing elements may be placed in two adjacent lines wherein, as one progresses from top to bottom or bottom to top of the arrays the sensing elements are staggered to eliminate blank areas in the field of view of the telescope.

It should be emphasized that although the words vertical, horizontal, elevation, and azimuth are used herein, such words are intended merely to establish the usual orientation of the apparatus. The apparatus is essentially means for determining the position of the optical axis of a telescope relative to the geometrical centroid of a target in two dimensions and for servoing the optical axis into the direction of such centroid. In the absence of convenient words such as vertical, horizontal, elevation and azimuth, it would be necessary to use such words as "a first dimension, a second dimension perpendicular to said first dimension,..." and the like which, while not confusing, provide difficult reading. Therefore, with the understanding that the words vertical, horizontal, elevation and azimuth are to be used to describe the invention but not to limit the invention, these words shall be used in the specification.

Each element of the array has connected thereto means for amplifying the signal generated by that particular element, and means for generating a scaled signal when the signal on that particular element exceeds a predetermined amplitude. In a preferred embodiment, a bandpass filter is inserted into the electronics so that only signals within a predetermined frequency band are adapted to generate the scaled signal. An automatic gain control is preferably also included in each channel to normalize the channel noise, to avoid saturating the electronics and thereby avoid the limiting of the speed of recovery of the electronics from an impressed signal, and to scale the output of the channels.

In the electronic channels connected with the "fine-grained" or small sensors, a gate is preferably inserted into the electronics to cause the fine-track electronics to produce signals only during the central portion of the azimuth sweep, which effectively stops or limits the field of view of the telescope when the fine-track error signal is being produced. The gate may also be kept closed, if desired, during tracking by the coarse tracking array.

The number of elements, the dimensions of the elements, the type of sensing material, and the length of the arrays are chosen to meet system parameters such as sensitivity, resolution, field of view, tracking accuracy, and target characteristics.

To track the azimuth component of the area centroid of the target relative to the optical axis of the telescope, the field of view of the telescope is swept across the array perpendicular to the line of the array; or the array is moved relative to the field of view of the telescope.

To produce a coarse azimuth error signal, the outputs of all of the coarse channels and fine channels of the electronics of the sensor assembly are connected to gates to channel or not channel a scaled signal to the input of a summing amplifier. The gates are adapted to open only when signals are received from their respective electronics channel. The inputs of the summing amplifier are weighted to cause its output signal to be substantially proportional to the area extension of the entire target in the elevation dimension of the target at the particular azimuth position being measured. The output of the summing amplifier is connected through an integrator which produces a signal that is a measure of the time integral of the output of the summing amplifier. That integral is proportional to the area of the target. The summing amplifier output is also connected to a multiplier which multiplies the output of the summing amplifier by the instantaneous azimuth scan signal. The output of the multiplier is a measure of the moment, about the azimuth axis, of the incremental area of the target being measured by the sensing array. The output of the latter integrator is divided by the output of the former integrator to produce a signal that is a measure of the coarse azimuth error, i.e., the azimuthal displacement of the optical axis of the telescope from the area centroid of the target. This signal is an interative signal in that it is consecutively updated at the end of each consecutive azimuth sweep. A sample and hold circuit is connected to the output of the divider to hold the information therein until a new value is received.

The fine azimuth error is detected in a similar fashion to that of the coarse azimuth error, preferably with modifications which allow the fine channel electronics to be activated only during a small portion of the azimuth sweep near the optical axis. Further, only the fine sensor electronic channels are used to determine the fine aximuth error.

To determine the value of the coarse and fine elevation errors, a pair of digital-to-analog converters are connected to receive the outputs of the coarse channel electronics, and a second pair of digital-to-analog converters are connected to receive the outputs of the fine channel electronics.

With each pair of digital-to-analog converters, the outputs of the channels connected to the sensors on one side of the center of the sensing array are connected to one of the digital-to-analog converters while the channels connected to the sensors on the other side of the center of the array are connected to the other of the digital-to-analog converters. The outputs of one of the digital-to-analog converters in each pair is given a positive designation, and the output of the other of the digital-to-analog converters in each pair is given a negative designation.

Inverting amplifiers may be used to achieve the positive and negative designation, as required. The outputs of the two digital-to-analog converters, in each pair, are connected through a summing amplifier to produce an elevation error signal. That is, the output of the summing amplifier connected to the two digital-to-analog converters associated with the coarse channels produces the coarse elevation error signal, and the output of the summing amplifier connected to the two digital-to-analog converters associated with the fine channel electronics produces a fine elevation error.

The elevation and azimuth error signals are channeled to the telescope positioning servos to center the optical axis of the telescope onto the geometrical centroid of the target. Circuitry is preferably provided to select only the fine or only the coarse error signal in elevation and in azimuth to control the telescope depending upon the extent of the target image in the field of view of the telescope.

It is therefore an object of this invention to track a target.

It is another object of this invention to track an infrared target.

It is a more specific object of this invention to track the area centroid of a target.

It is also a more specific object of this invention to track the area centroid of an infrared target.

It is a more specific object of this invention to track the area centroid of received radiation which has predetermined amplitude and/or frequency characteristics.

It is still a more specific object of this invention to provide means and method for achieving the above enumerated objects.

It is yet a more specific object of this invention to provide a novel tracking mechanism and electronic combination which is adapted to achieve the above-enumerated results.

It is likewise an object of this invention to servo the optical axis of an optical system to the geometrical centroid of a target.

BRIEF DESCRIPTION OF THE DRAWINGS

Other objects will become apparent from the following description, taken in connection with the accompanying drawing.

DETAILED DESCRIPTION OF THE INVENTION

Figure 1:
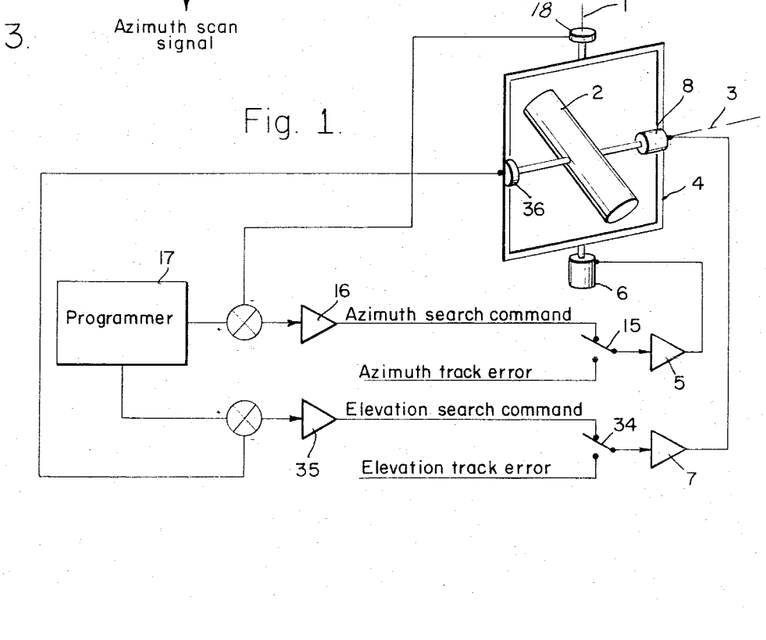
FIG. 1 is a telescope, adapted to be trained in azimuth and elevation, including a control system for pointing the telescope.

A telescope 2 is shown in FIG. 1 mounted upon gimbals 4 for angular freedom about the azimuth axis 1 and the elevation axis 3. The gimbal 4 is driven by motor 6 in response to signals from the amplifier 5. The motor 8 is driven in response to the output of amplifier 7.

The amplifier 5 is connected through a switch 15 to receive signals from an amplifier 16 or to receive the azimuth track error signals (FIG. 11) generated by the apparatus of this invention. The amplifier 16 drives the motor 6 to point the telescope about the azimuth axis 1. To that end, it receives command signals from a programmer 17 and response signals from a pickoff 18 which is positioned on the azimuth axis of the telescope 2 and the gimbal 4. The output of the pickoff 18 is subtracted from the output of the programmer 17 to produce an azimuth search error signal in the usual manner.

Similarly, the input of the amplifier 7 is connected through a switch 34 to the output of an amplifier 35 or to the elevation track error signal (FIG. 10) produced by the apparatus of this invention. The input of the amplifier 35 is connected to receive signals from the programmer 17 and from the pickoff 36 which is positioned upon the elevation axis of the telescope 2. The signals of the pickoff 36 are subtracted from the signals of the programmer 17 to cause the output of the amplifier 35 to produce an elevation error signal.

Figure 2:
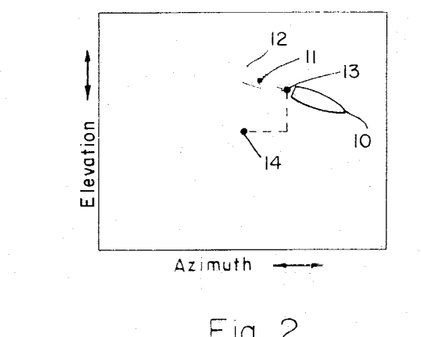
FIG. 2 shows a typical field of view of the telescope of FIG. 1.

A typical field of view of the telescope 2 is shown in FIG. 2. Within the field of view is a missile 10 having a plume 12 of hot gasses. Assuming that the plume 12 is very much hotter than the missile 10, a heat seeker or center of heat tracker would track the point 11. The geometric centroid tracker of this invention tracks the geometric centroid 13 which is much closer to the selected target 10. The apparatus of this invention then controls the telescope 2 to cause the optical axis 14 to be driven to coincide with the point 13.

Figure 3:
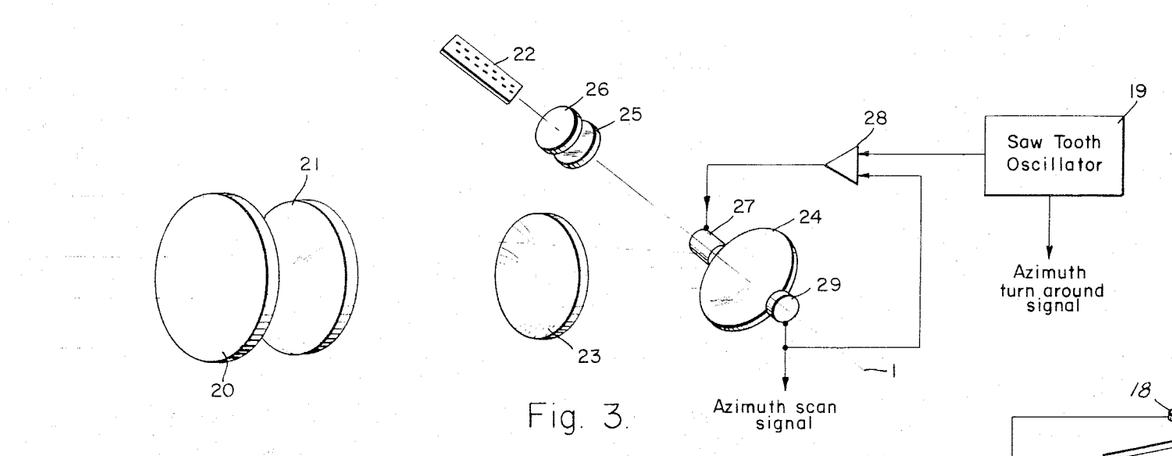
FIG. 3 is a diagram of the optical system of FIG. 1, including means for azimuth sweeping of the sensors.

A typical optical system for use with an infrared tracker, in accordance with this invention, is shown in FIG. 3. An infrared dome 20, which may be made of silicon, allows infrared radiation to strike the forward lens 21, which may be made of arsenic trisulfide. The edge of the lens 21 produces an aperture stop (not shown). Radiation from the forward lens 21 is directed through the after lens 23, which may be made of magnesium fluoride. A dithered scan mirror 24 rocks about the azimuth axis 1 to cause incoming radiation to sweep across the sensor assembly 22. Between the scan mirror 24 and the sensor assembly 22 may be positioned a detector window 25 and an optical filter 26. Typically, the window 25 is the window of a cryogenic compartment (not shown), and elements 22 and 26 are within the compartment.

The scanning mirror 24 is rocked about the azimuth axis 1 by the motor 27 which is driven by the servo amplifier 28. The servo amplifier 28 receives signals from the pickoff 29 and the sawtooth oscillator 19. The sawtooth oscillator also generates a "azimuth turn around signal" whenever the sawtooth oscillator signal waveform changes direction.

It should be emphasized that although the invention is described wherein the scan is about the azimuth axis, that the words azimuth and elevation are relative terms. It is not intended that the invention should be avoided merely by turning the apparatus onto its side. Accordingly, although the azimuth and elevation axes, in the usual operation of the apparatus, have their normal meanings, and are so described in this specification, in the claims they may be recited as a first axis and a second axis perpendicular to the first axis.

Further, although the device is essentially one which senses error signals in the elevation and azimuth angles, the displacement on the focal plane of the apparatus at the sensing assembly 22 is essentially lineal, and it is adapted to sense vertical and horizontal displacement as well as angular displacement between the optical axis of the apparatus and the geometric centroid of the target.

Figure 4:
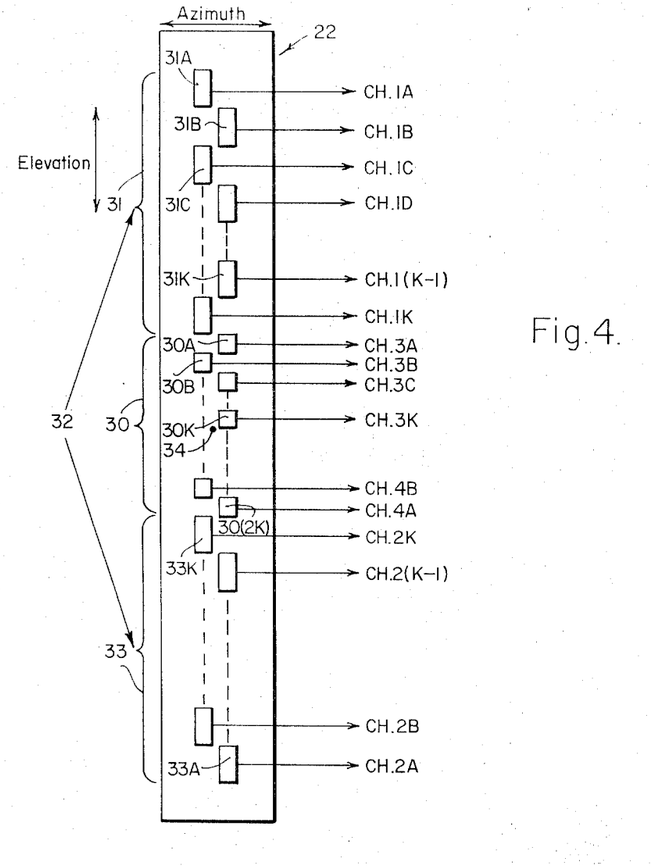
FIG. 4 is a profile view of a sensor array used in this invention with the individual elements greatly enlarged and some of the elements merely indicated.

FIG. 4 is a plan view of an embodiment of a typical sensor assembly 22 used in this invention. The two directions, azimuth and elevation, are designated. The elements of the array are preferably made of photovoltaic indium antimonide, although the invention is not limited to the use of that material.

The detector configuration is a line detector comprising two multiple element arrays 30 and 32, arranged substantially colinearly, to sense the extent of the target area in one dimension designated the elevation dimension. Sensing in a direction perpendicular to the line of the array elements, e.g., in the azimuth direction, is achieved by sweeping the field of view across the line of elements in the direction designated the azimuth direction.

The arrays of sensing elements each have an even number of substantially identical elements symmetrically positioned relative to the center 34 of the assembly 22.

The first array 30 of elements comprises a plurality of small elements 30A, 30B, 30C, . . . , called a fine track array, positioned symmetrically about the center 34 of the line of elements.

The second array 32, called the coarse track array, is positioned exterior to the fine track array at 31 and 33. The coarse track array comprises a plurality of elements 31A, B, C ... on one end of the array 30 and 33A, B, C ... on the other end of the array 30. The elements 31 are the same in number as the elements 33. The sensing elements of the arrays 30 and 32 are preferably rectangular with the long dimension in the elevation direction of the drawing in FIG. 4. It is within the conception of this invention that the elements of the fine track array 30 may be square, or that their dimension in the azimuth direction may exceed their dimension in the elevation direction.

It should be noted, as shown in FIG. 4, that although the sensing elements may be aligned in a single line, they may also be placed in two adjacent vertical lines wherein, as one progresses from top to bottom or bottom to top of the assembly 22, the sensing elements are staggered to eliminate blank areas in the field of view of the telescope.

Figure 5:
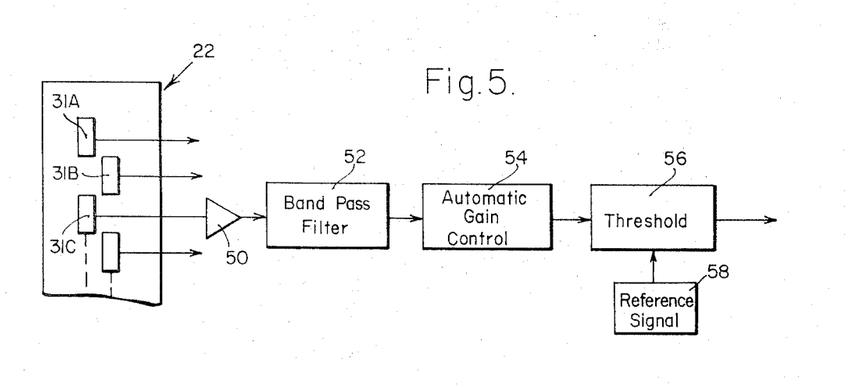
FIG. 5 is a block diagram of one channel of the electronics connected to each sensing element of the array of sensing elements.

Each of the sensing elements in both the coarse channel array 32 and the fine channel array 30 is connected to a series of electronics such as, for example, that shown in FIG. 5.

Referring to FIG. 5, the output of an element, such as element 31C, is connected through an amplifier 50 to a bandpass filter 52. The bandpass filter 52 may also include some amplification. The purpose of the bandpass filter is to pass over those signals which are most representative of the target under surveillance. The particular band of frequencies to be passed by the bandpass filter is determined in each instance by the expected spectral characteristics of the target, its expected dimensions, its expected direction of motion, the expected non-target background radiation characteristics, and the like. It should be emphasized that the bandpass filter 52 may be omitted, and the apparatus is still within the spirit and scope of the invention. Further, the amplifier 50 and filter 52 may be combined.

An automatic gain control circuit 54 is inserted into the electronics to produce a normalized noise signal.

Further, the use of an automatic gain control circuit 54 prevents the electronics from saturating, whereby the response of the electronics to changes in input signal, or the recovery time of the electronics, is relatively short.

It should be noted that although the automatic gain control circuit 54 is desired, it is within the spirit and scope of the invention to omit the automatic gain control circuit 54.

The output of the automatic gain control circuit 54 is connected to a threshold circuit 56. The threshold circuit 56 has an adjustable threshold which is controlled by the reference signal means 58. The purpose of the threshold circuit 56 is to inhibit noise while allowing signals to appear at the output of the channel.

The outputs from the channels, connected to sensors 31A, B, C, . . ., are designated, respectively coarse electronic channels 1A, B, C . . . The outputs of the electronic channels connected to sensors 33A, B, C ... are designated coarse electronic channels 2A, B, C .... The outputs of the fine electronics channels connected to the sensors 30A, B, C, . . ., which are above the center 34, are designated channels 3A, B, C, . . . The fine channel electronic channels connected to the sensors 30A, B, C ..., which are below the center 34 of the assembly 22, arre designated channels 4A, B, C, . . .

Figure 6:
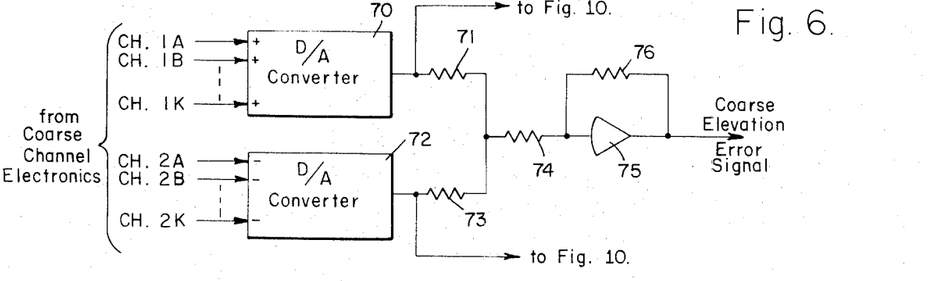
FIG. 6 is a block diagram of apparatus adapted to receive signals from the coarse channel electronics to produce a coarse elevation error signal.

The coarse channels 1A, B, C, . . ., are connected to the input of a digital-to-analog converter 70. As shown in FIG. 4, channel 1K receives the output of sensing element 31K, which is the element closest to the center 34 within the group of sensors 31. The output of the digital-to-analog converter 70 produces one unit of output signal when channel 1K is energized. When channel 1(K−1) is energized, converter 70 produces two units of output. When channel 1(K−2) is energized, converter 70 produces three units of output. The channel connected to the fourth coarse sensor of group 31 causes converter 70 to produce four units of output, the fifth five units, the sixth six units, etc.

The channels 2A, B, C ... are connected to the input of digital-to-analog converter 72. The digital-to-analog converter 72 is adapted to produce negative signals when one or more of its inputs is energized. When channel 2K is energized, the output of conveer 72 is one unit of output. When channel 2(K−1) is energized, the output of converter 72 is two units. It should be noted that channel 2K is connected to sensor 33K, and channel 2(K−1) is connected to sensor 33(K−1). The channel connected to the third sensing element, proceeding downward in FIG. 4, of group 33 produces three units of output from converter 72. The channel connected to the fourth sensor produces four units of output, the fifth sensor five units of output, etc.

The positive output of converter 70 is combined with the negative output of converter 72, through summing resistors 71 and 73, to the summing junction of a summing amplifier. The summing amplifier comprises a series resistor 74, an operational amplifier 75, and a feedback resistor 76. The output signal of amplifier 75 is the coarse elevation error signal, which is connected, through the switch 200 of FIG. 11, to the elevation pointing servo, shown in FIG. 1, for moving the optical axis 14 of the telescope, in elevation, to the elevation of the area centroid 1f the target.

Figure 8:
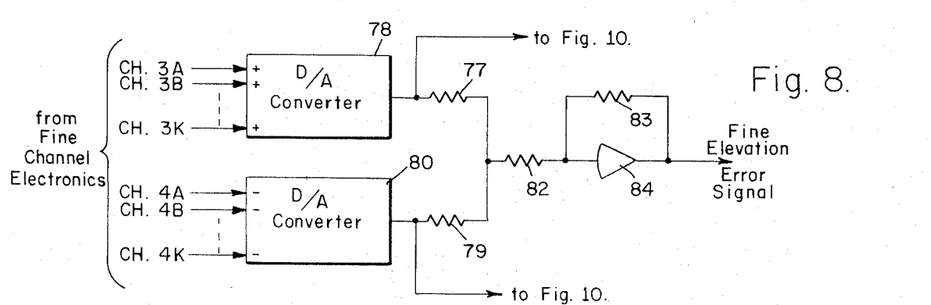
FIG. 8 is a block diagram of apparatus adapted to receive signals from the fine-channel electronics to produce a fine elevation error signal.

In a similar fashion, channels 3A, B, C ... are connected to the input of digital-to-analog converter 78, and channels 4A, B, C ... are connected to the input of digital-to-analog converter 80. The channel 3K, connected to the first fine array sensor 30K above the center 34, produces one unit of output from digital-to-analog converter 78. The second channel, connected to the second sensor above point 34, produces two units of output, the third three units of output, the fourth four units of output, etc.

The outputs of converter 80 are negative. The channel 4K (not shown), connected to the first fine sensor below point 34 in FIG. 4, produces one unit of output of converter 80. The channel connected to the second sensor below point 34 produces two units of output, the third three units of output, the fourth four units, etc.

The positive output of converter 78 and the negative output of converter 80 are summed through the summing resistors 77 and 79 at the input to a summing amplifier. The summing amplifier comprises a series resistor 82, an operational amplifier 84, and a feedback resistor 83. The output of the amplifier 84 is the fine elevation error signal which is connected, through switch 200 of FIG. 11, to the elevation pointing servo of FIG. 1.

It should be noted that the units of output of converters 78 and 80 are substantially smaller than the units of output of converters 70 and 72, the relative sizes of the units of output preferably being proportional to the dimensions measured in the elevation direction, of the fine and coarse grain sensors in the sensor assembly 22.

Figure 7:
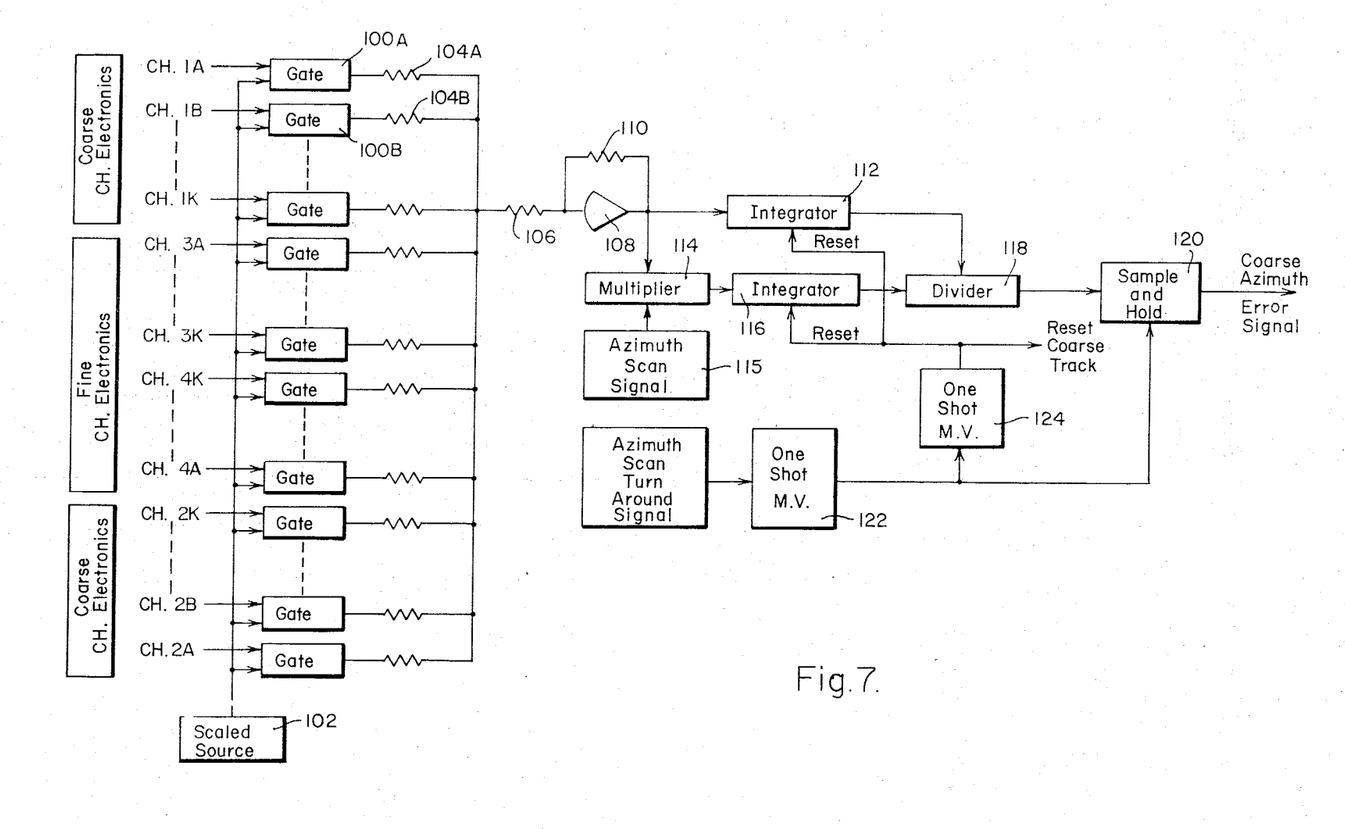
FIG. 7 is a block diagram of apparatus adapted to receive signals from the coarse channel electronics to produce a coarse azimuth error signal.

A mechanism for producing the coarse azimuth error signal is shown in FIG. 7. The coarse channel electronic channels 1A, B, C ..., 2A, B, C ... and the fine channel electronic channels 3A, B, C ..., 4A, B, C ...; are each connected to a separate gate 100A, B, ... to control the opening or closing of gates. A scaled signal source 102 is connected to each of the gates 100A, B, C .... When a gate is opened by a signal on that particular gate, the scaled signal from source 102 is delivered through a summing resistor 104A, B, ... to a summing amplifier.

The summing amplifier comprises a series resistor 106, an operational amplifier 108, and a feedback resistor 110. The output of the amplifier 108 is a measure of the extent of the target within the field of view, in the elevation direction, at the particular azimuth whose image is instantaneously impressed upon the sensors of the assembly 22.

The output of the amplifier 108 is connected to an integrator 112 which integrates its input over one azimuth sweep of the field of view. The output of the integrator 112 is, therefore, proportional to the area of the target projected onto the field of view of the telescope 2.

The azimuth scan signal, generated by the pickoff 29 (FIG. 3) is a measure of the instantaneous azimuth position of the sensor assembly in the field of view of the telescope relative to the center 14 of the field of view. The output of the amplifier 108 and the output of the pickoff 29 are delivered to a multiplier 114. The output of the multiplier 114 is connected to the input of an integrator 116 which intergrates the output of the multiplier 114 over one azimuth sweep of the apparatus. The output of the integrator 116, at the end of the sweep, is a measure of the moment, of the projection of the target on the field of view, about an azimuth axis intersecting the optical axis 14, i.e., the right-left moment in FIG. 2. The scan signal 115 is preferably biased to zero when the optical axis 14, is incident upon the assembly 22.

The outputs of integrators 112 and 116 are connected to a divider circuit 118 which divides the output of the integrator 116 by the output of the integrator 112. The sample and hold circuit 120 is connected to the output of the divider circuit 118 at the end of each azimuth sweep immediately before the integrators 112 and 116 are reset.

The sample and hold circuit, therefore, has an output which is updated at the end of each azimuth sweep to produce the coarse azimuth error signal, e.g., a signal which is a measure of the dashed line extending to the right of 14 in FIG. 2.

At the end of each azimuth sweep, the sawtooth oscillator 19 (FIG. 3) produces an azimuth turn-around signal which triggers a one-shot multivibrator 122. The output of multivibrator 122 is connected to the sample and hold circuit 120 to cause the sample and hold circuit 120 to sample the output of the divider 118 when the multivibrator 122 is triggered. A second one-shot multivibrator 124 is connected to the output signal of one-shot multivibrator 122. The output of multivibrator 124 is connected to the reset inputs of integrators 112 and 116. The multivibrator 124 produces a slight delay after the output of multivibrator 122, whereby the output of the divider 118 is sampled before the integrators 112 and 116 are reset.

Figure 9:
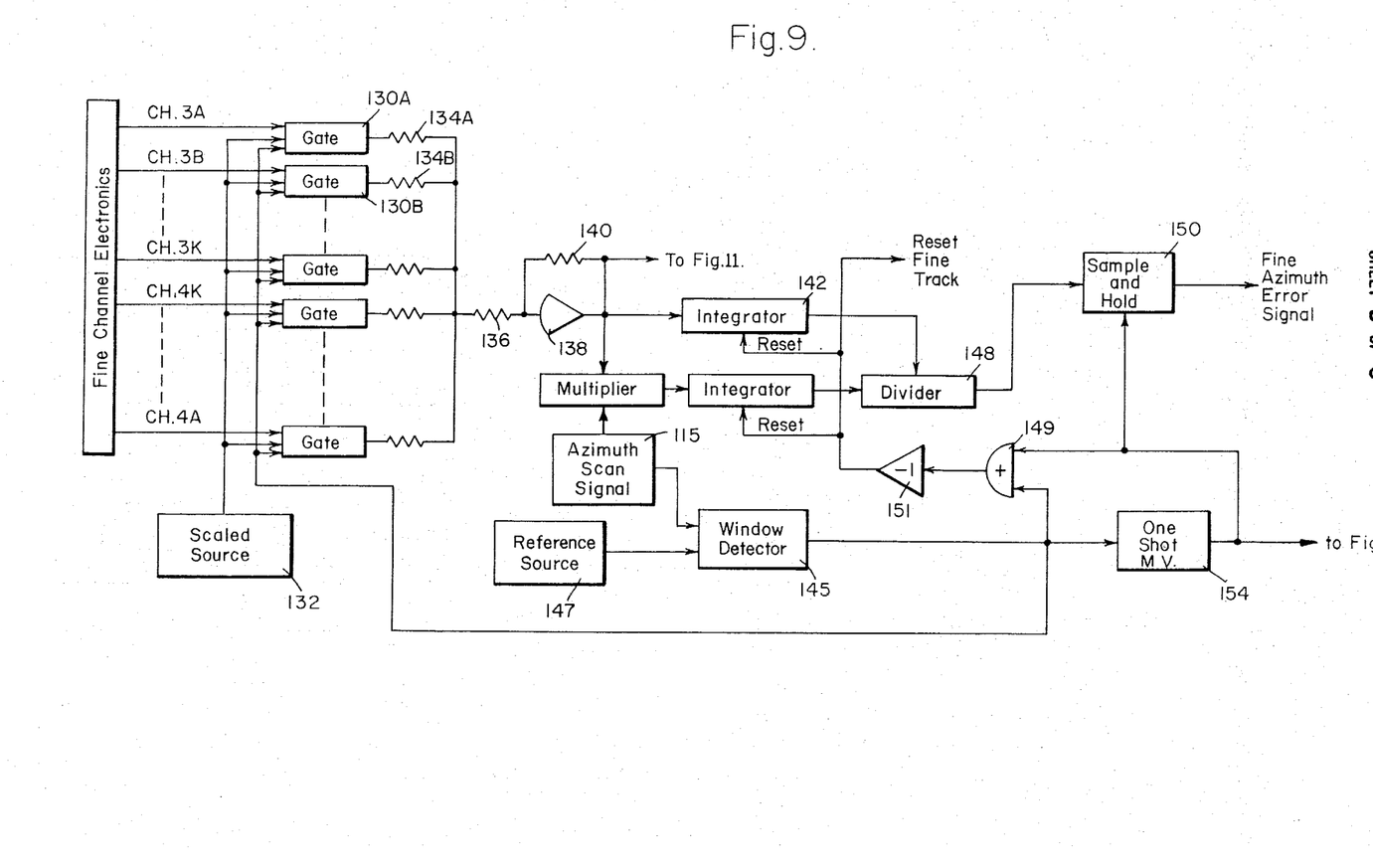
FIG. 9 is a block diagram of apparatus adapted to be connected to the fine channel electronics to produce a fine azimuth error signal.

A mechanism for producing the fine azimuth error signal is shown in FIG. 9. The fine channel electronic channels 3A, B, C ... and 4A, B, C ... are each connected to a separate gate 130A, B, C ... to control the opening or closing of the gates. The gates 130A, B, C ... are also controlled by the output signal of the window detector 145 which limits the operation of the circuit to regions close to the optical axis 14. A scaled signal source 132 is connected to each of the gates 130A, B, C .... When a gate is opened by a signal from its associated electronic channel AND an output of window detector 145, the scales signal from source 132 is delivered through a summing resistor 134A, B, C ... to a summing amplifier.

The summing amplifier comprises a series resistor 136, and operational amplifier 138, and a feedback resistor 140. The output of the amplifier 138, is the measure of the extent of the target, in the elevation direction, within the portion of the field of view of the telescope defined only by the fine array 30 at the particular azimuth position of the sensors of the array 30 relative to the center 14 of the field of view of the telescope.

The output of the amplifier 138 is connected to an integrator 142 which integrates its input over one azimuth sweep, as defined by the reference source 147 and the window detector 145, of the integrator 142 is, therefore, proportional to the area of the target projected onto the portion of the field of view sensed by the array 30 of telescope 2 and defined by the window detector 145.

The azimuth scan signal generated by the pickoff 29 (FIG. 3) is a measure of the azimuth of the portion of the field of view which instantaneously is incident upon the sensor assembly 22. The output of the amplifier 138 and the output of the pickoff 29 are delivered to a multiplier 144. The output of the multiplier 144 is connected to the input of an integrator 146 which integrates the output of the multiplier 144 over one azimuth sweep of the apparatus. It should be noted that the integrators 142 and 146 are held in their reset position over a portion of the sweep of the azimuth scan signal, whereby the width of the field of view of the telescope, as sensed by the array 30, is narrowed. In a preferred embodiment, the integrators 142 and 146 are maintained by the "reset fine track" signal in their reset position except when the region of the optical axis of the field of view adjacent the optical axis 14 is incident upon the sensor assembly 22. The azimuth scan signal 115 is connected to a window detector 145 whose output is controlled by a reference source 147 to occur only when the field of view, within a predetermined angle of the optical axis, is incident on the sensor assembly 22. The window detector 145 is adapted to produce a signal when the azimuth scan signal 115 is less than the amplitude of the reference source 147, whereby the output signal of the window detector occurs only when the field of the telescope, within a narrow range of azimuth in the region of the optical axis of the telescope 2, is incident on assembly 22. The output of the window detector 145 is connected through a NOR gate comprising an OR gate 149 and an inverting amplifier 151 to produce the reset-fine-track signal which is connected to reset the integrators 142 and 146.

The output of the integrator 146, at the end of the portion of the sweep defined by the window detector 145, is a measure of the moment of the projection of the target on the field of view defined by the array 30 and defined by the window detector 145, about an azimuth axis intersecting the optical aixs 14, i.e. left-right in FIG. 2.

The outputs of integrators 142 and 146 are connected to a divider circuit 148 which divides the output of the integrator 146 by the output of the integrator 142. The sample and hold circuit 150 is connected to th output of the divider circuit 148 to sample the output of the divider circuit 148 at the end of the portion of the azimuth sweep defined by the window detector 145 immediately before the integrators 142 and 146 reset. A one-shot multivibrator 154 is connected to the output of the window detector 145. The one-shot multivibrator 154 is activated when the window detector 145 is deactivated. The output of the one-shot multivibrator 154, connected to the sample and hold circuit 150 causes the sample and hold circuit 150 to sample. The output of the one-shot multivibrator 154 is also connected to the input of the OR gate 149, whereby the integrators 142 and 146 are prevented from resetting until the output of the one-shot multivibrator 154 relaxes.

The sample and hold circuit 150, therefore, has an output which is up-dated at the end of each azimuth sweep of the portion of the field of view of telescope 2 defined by the window detector 145 to produce the fine azimuth error signal.

Figure 10:
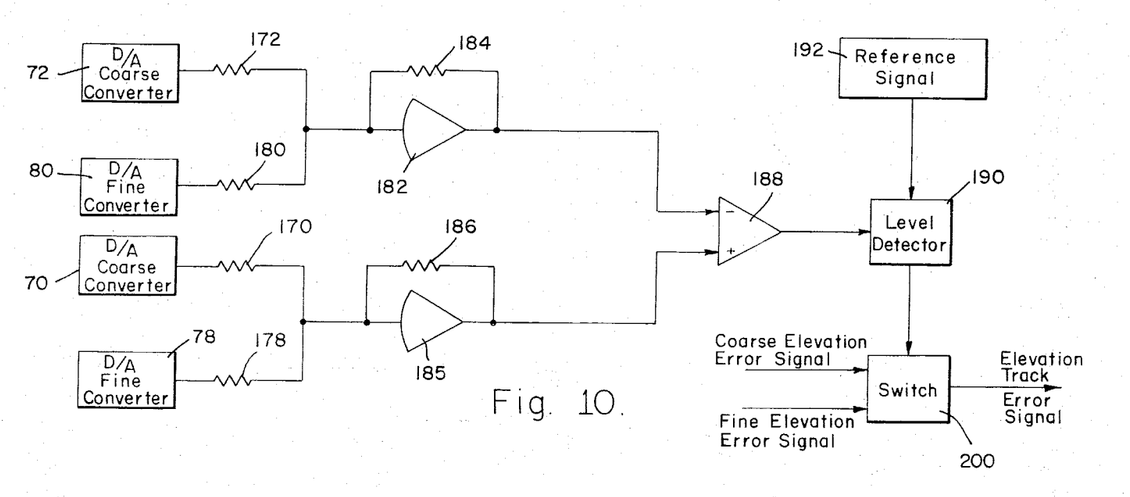
FIG. 10 is a block diagram of apparatus adapted to produce a signal indicative of the extent of the target image in the field of view of the optical system.
Figure 11:
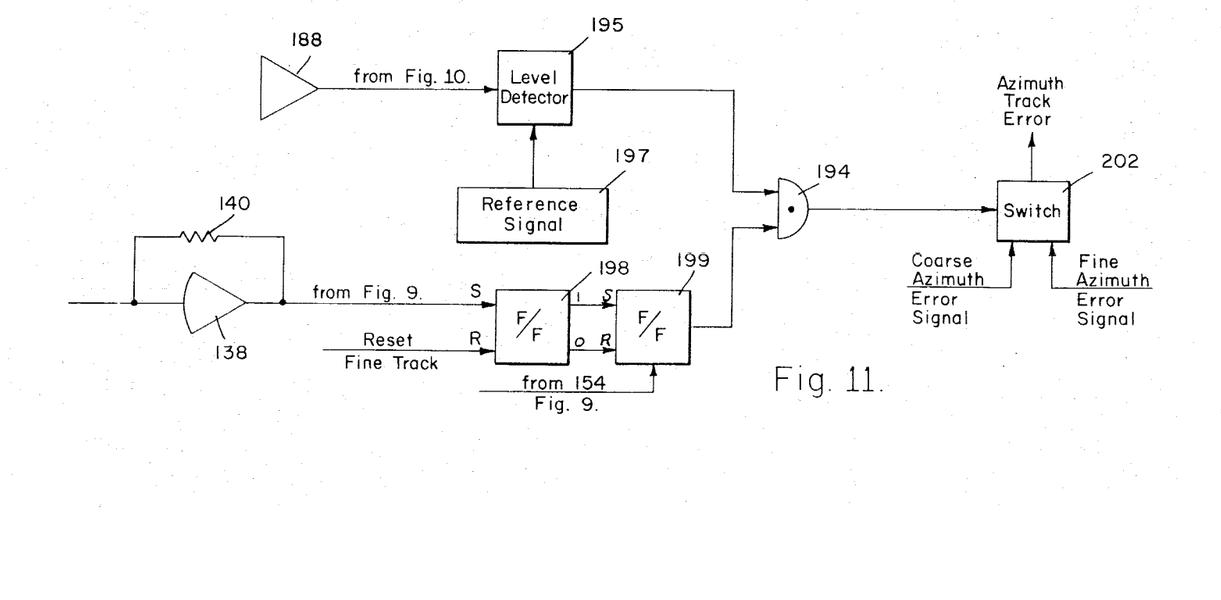
FIG. 11 is a block diagram of apparatus adapted selectively to channel coarse or fine azimuth error signals to the optical system.

The circuits of FIGS. 10 and 11 are adapted to transfer control of the telescope pointing servos of FIG. 1 between the fine error signals and the coarse error signals. To that end, the output of the digital-to-analog converters 72 and 80 are connected through the series resistors 172 and 180, respectively, to the summing junction of an operational amplifier 182 having a feedback resistor 184. In a typical circuit, the resistance of the resistor 172 is one-half of the resistance of the resistor 184, and the resistance of resistor 180 is twice the resistance of the resistor 184, whereby signals at the output of the coarse digital-to-analog converter 72 are given eight times the the weight of the signals at the output of the fine digital-to-analog converter 80.

In a similar manner, the output of the digital-to-analog converter 70 is connected through a series resistor 170, and the output of the fine digital-to-analog converter 78 is connected through a series resistor 178 to the summing junction of an operational amplifier 184 having a feedback resistor 186. Typically, the resistance of the resistor 170 is one-half of the resistance of resistor 186, and the resistance of the resistor 178 is twice the resistance of the resistor 186, whereby the output of the coarse digital-to-analog converter 70 is given eight times the weight of the output of the fine digital-to-analog converter 78.

The outputs of the converters 72 and 80 are opposite in sign to the outputs of the converters 70 and 78, whereby the outputs of the amplifiers 182 and 185 are of opposite sign. The outputs of amplifiers 182 and 185 are connected, respectively, to the negative and positive terminals of a subtracting amplifier 188 which produces a signal which is a measure of the vertical extent of the target image in the field of view of the telescope 2, with the sensors in the array 32 given substantially more weight than the sensors within the array 30.

In operation, the telescope 2 is pointed in the direction of the expected target. That information, for example may come from a programmer 17, from a long range radar, or the like.

The programmer or computer 17, when the switches 15 and 34 are in the positions shown, drives the motors 6 and 8 through the amplifiers 5, 16, 7 and 34. The position of the optical axis of the field of view of the telescope 2 is sensed by the pickoffs 18 and 36 which feed back into the feedback amplifiers 16 and 35 in the azimuth search command and elevation search command loops.

When the telescope 2 has been pointed, the switches 15 and 34 are switched to the track mode. It is to be emphasized that although mechanical switches 15 and 34 are shown, electronic switching is equivalent.

The saw tooth oscillator 19, in FIG. 3, dithers the mirror 24 by the motor 27. The mirror 24 tracks the output of the sawtooth oscillator 19 by the pickoff 29 and the servo amplifier 28 within a closed servo loop. The field of view of the telescope is consecutively swept by the dithering mirror 24 about the azimuth axis 1 across the sensor assembly 22.

Referring to FIG. 4, when illumination from a target strikes one of the elements of the array 30 or the array 32, a signal is entered in the corresponding fine channel or coarse channel electronics as shown in FIG. 5. The signal in each channel is amplified by the amplifier 50, passed by bandpass filter 52 if the signal is within the predetermined passband, and operated upon by the automatic gain control circuit 54.

When the output of the automatic gain control 54 exceeds the amplitude of the reference signal of the source 58, the threshold circuit 56 produces a signal called a coarse channel signal or a fine channel signal, depending upon whether it is connected to the sensors of array 32 or array 30.

With no target within the field of view, no elevation track error signal nor azimuth track error signals are delivered to the amplifiers 5 and 7. If the telescope is mounted on a moving vehicle it may be desirable to stabilize the apparatus, and the switching mechanisms 15 and 34 may be held in their shown positions under control of the programmer 17 until a signal is received in at least one of the channels of the coarse or fine channel electronics before the switches 15 and 34 are switched to receive the track error signals.

Assume now that a distant target appears as a point target near the outer edges of the field of view of the telescope 2. As the mirror 24 sweeps the field of view across the sensor assembly 22, the target image excites one or more of the sensing elements of the array 32 and or the array 30. For simplicity of example it is assumed that the array 30 and the array 32 each have 16 elements, eight each on each side of the center 34 of the arrays. It is further assumed, for purposes of example, that the dimension of the elements of the array 32 are three times the length of the elements of the array 30 in the elevation direction.

Assume, now, that a single element 31B, which is the seventh element of the coarse array 32 above the center 34 is the only element initially excited by the point target. A coarse channel signal is then produced at the output of the threshold 56 associated with the element 31B. That channel is designated channel 1B. The signal on channel 1B produces an output on the digital-to-analog converter 70 which is weighted 29 units plus. (Channel 1C would have been weighted 26 units plus, channel 1D 23 units plus, and channel 3A would have been designated eight units plus, channel 3B seven units plus, etc.) The output signal of the digital-to-analog converter 70 is channeled through a summing amplifier comprising resistors 71, 74, 76, and operational amplifier 75 to produce a coarse elevation error signal. It is also channeled to the circuit of FIG. 10, through a summing amplifier of resistors 172, 184, and amplifier 182, through the difference amplifier 188 to the level detector 190 to produce an output signal which causes the coarse elevation error signal applied to switch 200 to be channeled to the elevation track error signal and thence to the amplifier 7 of FIG. 1 to cause the telescope 2 to move in elevation a distance required to reduce the elevation track error signal toward zero.

The output of amplifier 188 is also channeled, as shown in FIG. 11 to the level detector 195 to remove the signal from the gate 194 and allow the coarse azimuth error signal to be channeled through switch 202 to the azimuth track error, thence to amplifier 5 and motor 6 to move the field of view of the telescope 2 in azimuth in a direction to reduce the azimuth track error signal.

The azimuth error signal is produced by the apparatus of FIG. 7. The signal appearing at gate 100B is channeled through the summing amplifier comprising resistors 106, 110, and operational amplifier 108 to produce a signal at the output thereof which is proportional to one unit of amplitude during the time period that the target appears on the sensing element 31B.

The instantaneous azimuth scan signal, at the time a signal appears at the output of amplifier 108, is multiplied in the multiplier 114 by the signal at the output of amplifier 108, and the multiplied signal is integrated by the integrator 116. The output of the amplifier 108 is integrated by the integrator 112. The output of integrator 116 is divided, in the divider 118, by the output of the integrator 112. At the end of each sweep the azimuth scan turn around signal from the saw tooth oscillator 19 operates the one-shot multivibrator 122 to cause the sample and hold circuit 120 to sample the output of the divider, thereby producing a coarse azimuth error signal. Immediately thereafter the one shot multivibrator 124 triggers a "reset coarse track" signal which resets the integrators 112 and 116 to receive information during the next sweep of the mirror 24.

As the optical axis of the telescope 2 is servoed toward the target, the sensing elements closer to the center 34 of the assembly 22 are consecutively intercepted by the point target. The action is relatively fast, and shortly the point target would intercept the elements of the fine-track array 30, starting with element 30A.

When the point target is intercepted by element 30A of the fine array 30, it either has an azimuth position within the window defined by the window detector 145 or it does not.

It is instructive to view the waveforms of the azimuth gating signal at the output of the window detector, the fine track sample pulse at the output of the one-shot multivibrator 154, and the reset fine track signal at the output of the amplifier 151 of FIG. 10. These signals are shown, respectively, in FIG. 12. The graph is shown, starting when the azimuch sweep passes over the optical axis.

Figure 12:
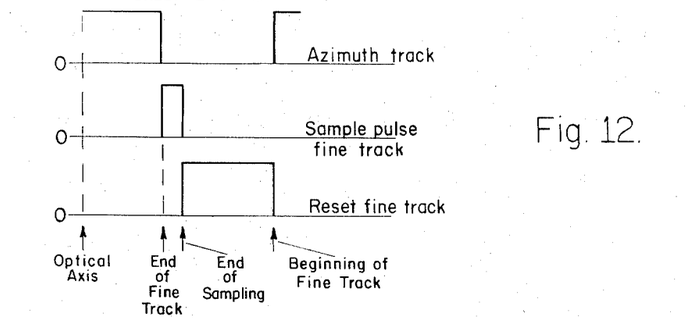
FIG. 12 is a timing diagram for controlling the gating of the electronics to stop the sensors into a narrow field of view when the fine channels are utilized.

As the azimuth sweep extends outward from the optical axis, it reaches the end of the predetermined fine track portion of the field of view, at which time the one shot multivibrator 154 is triggered producing the fine track sample pulse. As the one-shot multivibrator 154 relaxes, the reset fine track signal is produced at the output of the amplifier 151.

If the point target does not have an azimuth position within the window defined by the window detector 145, the output of amplifier 188 (FIG. 10) is below the threshold of level detector 190, set by the reference signal 192, whereby the switch 200 connects the Fine Elevation Error Signal to the elevation servo of FIG. 1 to control the elevation pointing of the telescope 2.

Because the point target has an azimuth position outside of the window defined by the window detector 145, signal arrive at the S terminal of flip flop 198 concurrently with signals on the R terminal, whereby the flip flop 198 is not set and gate 194 does not conduct. Switch 202 continues to connect the Coarse Azimuth Signal to control the azimuth pointing of the telescope 2.

When the point target, due to the moving of the field of view of the telescope 2, has an azimuth position within the field of view defined by the window detector 145, a signal is delivered to the S terminal of flip flop 198 when there is no signal on the R terminal. The 1 output terminal of flip flop 198 is energized, energizing the S terminal of flip flop 199. Flip flop 199 is strobed or clocked by the output of one shot multivibrator 154 of FIG. 9 just prior to the closing of the window defined by the window detector 145 to set the output of the flip flop 199. The output of amplifier 188 is below the value defined by the reference signal 197, whereby a signal is delivered from level detector 195, through gate 194, to switch 202, connecting the Fine Azimuth Error Signal to control the azimuth of the telescope 2.

Assume that the first element of the fine track array intercepted by the point target image is element 30A. The output of the corresponding fine channel 3A is channeled into gate 130A of FIG. 9 and into digital-to-analog converter 78 of FIG. 8. The fine channel signal at the output of threshold detector 56 of FIG. 5, corresponding to the sensor 30A, is connected to the input of the digital-to-analog converter 78, in the example wherein eight units of signal also appear at the output of amplifier 188, and such eight units are below the amplitude of the reference signal of the source 192, whereby the switch 200 is caused to channel the fine elevation error signal from the output of amplifier 84 into the elevation track error to control the pointing of the telescope 2 in elevation.

The fine channel 3A also is connected to enable the gate 130A to deliver a signal from the scaled source 132 into the input of a summing amplifier having a plurality of series connected summing resistors 134A, B, C ... series resistor 136, feedback resistor 140 and operational amplifier 138. The gate 130A is shuttered by the window detector 145 to open only when the target image is within a predetermined azimuth angle, near and on both sides of the optical axis 14 of the field of view of the telescope 2. With the target image within that azimuth angle, and the reset signal removed from the integrators 142 and 146, the output of the amplifier 138 is integrated by the integrator 142. The output of the amplifier 138 is also multiplied in the multiplier 144 by the instantaneous azimuth scan signal 115. The output of the multiplier 144 is integrated by the integrator 146. The output of the integrator 146 is divided in the divider 148 by the output of the integrator 142 to produce a signal at the output of the divider 148, at the end of the portion of the azimuth sweep determined by the window detector 145, to produce a signal which is the fine azimuth error signal.

The opening of the window detector 145 removes the reset signal from the integrators 142 and 146. The closing of the window detector 145 activates the one shot multivibrator 154 to cause the sample and hold circuit 150 to sample the output of the divider 148. When the output of the one shot multivibrator is extinguished, the reset signals are again applied to integrators 142 and 146 preparing them for the next sweep of the azimuth signal.

As the target gets closer and closer, it begins to fill the portion of the field of view which is sensed by the array 30, i.e. the fine track array. With the point target substantially centered on the optical axis, as the target blooms or becomes larger, the same number of sensors of the array 30 on each side of the center 34 are activated, whereby the fine elevation error signal at the output of amplifier 84 remains substantially zero. As the target gets larger, its asymmetry becomes evident. If the geometric centroid of the target drifts upward or downward from the optical axis of the telescope 2, the output of the digital-to-analog converter 80 is compared with the output of the digital-to-analog converter 78, and a resultant signal representing the elevation deviation of the geometric centroid from the optical axis 14 of the field of view appears at the output of amplifier 84, and the signal at the output of amplifier 84 is used to recenter the optical axis of the telescope 2.

As the target becomes still larger, the signal at the output of amplifier 188 of FIG. 11 becomes larger, and when the target begins to excite the coarse sensors of the array 32, the signal at the output of amplifier 188 becomes large enough that the switches 200 and 202 are switched to cause the coarse azimuth error signal to be channeled to the azimuth track error channel of FIG. 1 and the coarse elevation error signal to be channeled to the elevation track error channel of FIG. 1.

With the coarse elevation error signal in control of the telescope 2, the output of the digital-to-analog converters 70 and 72 are compared to produce coarse elevation error signal at the output of amplifier 75 which are used to control the pointing of the telescope 2 about the elevation axis.

Similarly, the coarse azimuth error signal appearing at the output of the sample and hold circuit 120 of FIG. 8 is used to control the pointing of the telescope 2 about the azimuth axis.

The coarse azimuth error signal, under these circumstances, is produced from the instantaneous sum of the outputs of the gating circuits 100A, B, C ... which are summed through the summing amplifier of resistors 106, 110 and operational amplifier 108. The time integral of the output of integrator 112 over each sweep of the mirror 24. The instantaneous azimuth scan signal 115 is multiplied, in multiplier 114, and the output of multiplier 114 is integrated by the integrator 116 over one sweep of the azimuth scan signal. The output of the integrator 116 is divided by the output of the integrator 112 to produce a signal at the output of the divider circuit 118 at the end of each sweep which is proportional to the azimuthal deviation of the centroid of the target image from the optical axis 14 of the field of view of the telescope 2.

As shown in FIG. 2, the apparatus of this invention produces azimuth track error and elevation track error signals which are measures of the azimuthal and elevational deviation of the area centroid 13 of the target 10, including its hot plume 12 from the optical axis 14 of the telescope 2.

Thus, the apparatus of this invention causes the optical axis 14 of the telescope 2 to be centered on the centroid 13 rather than the hottest portion 11 of the target, whereby the target 10 is more closely tracked by the heat seeking system of this invention than in prior known apparatus.

Although the invention has been described in detail above, it is not intended that the invention shall be limited by that description, but only in accordance with the appended claims taken in combination with that description.

We claim:

1. Apparatus for pointing the axis of a sighting device at the geometrical centroid of a signal defined target area comprising:
   a. a target sighting device having means to scan a predetermined field of view about a central axis;
   b. a radiation signal sensing assembly associated with said device and having first and second substantially colinear arrays of sensors each containing a plurality of sensors, the dimension of the sensors of said first array being smaller than the dimension of the sensors of said second array in the direction of said line of sensors, said first array being substantially symmetrical about a center point of said line of sensors, and said second array being split with a substantially equal number of sensors on each end of said line of sensors;
   c. a plurality of electronic channels, equal in number to said sensors, each said channels being connected to receive signals from a different one of said sensors and having amplifying means to amplify said signals and a threshold circuit for producing output signals only when the radiation sensed by the sensor attached to the particular electronic channel exceeds a predetermined amplitude;
   d. each of said electronic channels further including an automatic gain control circuit between its sensor and its threshold circuit and a band pass filter positioned between its sensor and its threshold circuit;
   e. first and second pairs of digital-to-analog converters, said first pair of converters being connected to receive signals from the electronic channels of said first array, said second pair of converters being connected to receive signals from the electronic channels of said second array, the outputs of electronic channels associated with the elements of each array on the first side of said center point being connected to the first said digital-to-analog converter in each said pairs of converters, and the outputs of electronic channels connected to the sensing elements on the other side of said center point being connected to the second said digital-to-analog converter of each said pair of converters;
   f. said first converter in each said pair of converters producing a positive output signal, said second converter in each said pair of converters producing a negative output signal, the amplitude of each said output signal being proportional to the weighted amplitudes of the input signals at the particular said converter, the weighting of said input signals being proportional to the distance of the sensor, associated with the particular input, from said center point;
   g. first and second summing means connected to the outputs of said first and second pairs of digital converters, respectively, to produce first and second signals, respectively, which are measures of the difference in amplitudes of the outputs of said converters in each pair; and
   h. means operatively connected to utilize said first and second signals to servo position said axis of said sighting device.

2. The assembly of claim 1 in which each said array has an even number of sensors, one-half on each side of said center point.

3. A radiation sensor assembly as recited in claim 1 in which adjacent sensors of each array are staggered into two closely-spaced lines of sensors with adjacent sensors in different ones of said closely-spaced lines.

4. A radiation sensor assembly as recited in claim 1 in which said sensors have a larger dimension in the direction of said line of sensors than in the direction perpendicular to said line.

5. A radiation sensor as recited in claim 4 in which said sensors are substantially rectangular, their larger dimension being in the direction of said line of sensors.

6. Apparatus as recited in claim 1 and further comprising:
   third summing means, connected to receive signals from said four digital-to-analog converters to produce a signal which is proportional to the sum of the amplitudes of the outputs of said digital converters; and
   switching means including an output terminal, a pair of input terminals, and a control terminal, said input terminals being connected to the outputs of said first and second summing means, and said control terminal being connected to the output of said third summing means to cause the connection of said output terminal to said first or second input terminals to be controlled in response to the amplitude of the output of said third summing means.

7. Apparatus as recited in claim 1 wherein said sighting device comprises a telescope having a field of view in which an optical axis is defined therein, and first and second directions, in a plane perpendicular to said optical axis, are defined therein;

said telescope being adapted to project its said field of view onto said radiation sensor assembly with said first defined direction projected substantially parallel to the line of sensors of said assembly.

8. Apparatus as recited in claim 7 and further comprising means for sweeping said field of view across said radiation sensor assembly in said second direction;

means for generating a scan signal which is a measure of the position, in said second direction, of said optical axis relative to the line of sensors of said sensing assembly, including means for generating a scan turn around signal indicating change of direction of the sweep of said field of view;

a fourth summing means;

a first source of scaled signal;

a first and second plurality of gate means, each having an input terminal and a control terminal, said input terminals being connected to said source of scaled signal, the control terminals of said first plurality of gate means being connected to the electronic channels from said first array of sensors, the control terminals of said second plurality of gate means being connected to the electronic channels from said second array of sensors, the output of said first and second plurality of gate means being connected to the input of said fourth summing amplifier means with different weighting on the output of said first and second plurality of gating means, said weighting being proportional to the length of said sensors in the direction of said line of sensors;

first integrating means connected to the output of said fourth summing means;

first multiplier means connected to receive signals from said fourth summing means and to receive a signal from said means for generating a scan signal to multiply these signals together;

second integrating means connected to the output of said first multiplier means;

dividing means, connected to receive signals from said first and second integrating means to divide the output of said second integrating means by the output of said first integrating means;

sample and hold means, connected to receive signals from said dividing means and to be activated in response to said scan turn around signal at the end of the sweep of said field of view across said sensor assembly; and means for resetting said integrating means immediately after said sample and hold means samples the output of said dividing means;

whereby the output of said sample and hold means is a measure of the displacement in said second direction of the area centroid of target images within said field of view.

9. Apparatus as recited in claim 8 and further comprising:

a third plurality of gate means, each having an input terminal and two control terminals;

window detector means connected to said means for generating a scan signal, and adapted to produce an output signal when said scan signal is within an amplitude range representing a predetermined narrowed field of view, in said second direction, adjacent said optical axis, the output of said window detector means being connected to one of the control terminals of each of the gate means of said third plurality of gate means;

a second source of scaled signal, connected to the input terminals of said gate means of said third plurality of gate means;

the second control terminals of said gate means of said third plurality of gate means being connected to receive signals from the electronic channels of said first array of sensors;

fifth summing means, connected to the outputs of said gate means of said third plurality of gate means;

third integrating means connected to the output of said fifth summing means;

second multiplier means connected to receive signals from said fifth summing means and to receive a signal from said means for generating a scan signal to multiply these signals together;

fourth integrating means connected to the output of said second multiplier means;

second dividing means connected to receive signals from said third and fourth integrating means to divide the output of said fourth integrating means by the output of said third integrating means;

second sample and hold means, connected to receive signals from said second dividing means and to be activated in response to signals from said window detector means at the end of the window defined by said window detecting means;

means for resetting said third and fourth integrating means immediately after said second sample and hold means samples the output of said second dividing means;

means for resetting said third and fourth integrating means immediately after said second sample and hold means samples the output of said second dividing means;

whereby the output of said second sample and hold means is a measure of the displacement, within the field of view defined by said window detecting means, in said second direction, of the area centroid of target images within said limited field of view.

10. Apparatus as recited in claim 9 and further comprising:

second switch means having two input terminals, an output terminal, and a control terminal, the output of said first sample and hold means being connected to a first said input terminal, the output of said second sample and hold means being connected to the second said input terminal, said switch means being adapted, in response to control signals on its control terminal, to connect its first or second input terminal to its output terminal; and means responsive to the output of said third summing means, said fifth summing means, and the output of said window detector means to apply a control signal to said control terminal of said second switching means to control said second switching means in response to the amplitude of the output of said third summing means and said fifth summing means when a target is within the field of view defined by said window detector means.

11. Apparatus as recited in claim 10 in which said telescope is adapted to be servoed in the direction of said first axis in response to the output of said first switching means, and is adapted to be servoed in the direction of said second axis in response to the output of said second switching means.

12. Apparatus as recited in claim 11 in which:
said telescope is servoed in a direction to center its optical axis on the centroid of a target sensed by said sensor assembly.

13. Apparatus as recited in claim 12 in which said first axis extends in an elevation direction and said second axis extends in an azimuth direction of said telescope.

14. In combination:
a telescope having an optical axis defined therein and mounted for separately controllable motion of said optical axis in a first and a second direction defined in a plane perpendicular to said optical axis;
means for sweeping the field of view of said telescope relative to a sensor position on the focal plane of said telescope in the direction of the image of said second axis on said focal plane;
said sensor comprising a plurality of aligned sensing elements, each of which is sensitive to incoming radiation, substantially aligned substantially in said focal plane in a direction perpendicular to the image of said second direction and parallel to the image of said first direction;
a plurality of electronic channels, including at least an amplifier in each channel, for producing amplified signals generated by said sensor elements, and including means for normalizing said signals into digital signals indicative of the presence or absence of radiation on the respective elements;
first converter means, connected to receive signals from said electronic channels associated with sensor elements on one side of the center of said sensor to produce a signal which is proportional to the sum of the distances of the energized sensor elements from the center of said sensor;
a second converter connected to receive signals from said electronic channels associated with the sensor elements on the second side of said center of said sensor to produce a signal proportional to the sum of the distances of the energized sensor elements on the second side of said center of said sensor; and
summing means connected to receive the outputs of said converters to produce a signal which is a measure in said first direction of the deviation between the projection of the geometric centroid of a target image on said first axis and said optical axis.

15. Apparatus as recited in claim 14 and further comprising servo means connected to the output of said summing means to be controlled thereby and connected to said telescope to move said telescope to cause said optical axis to coincide with the projection of said centroid on said first axis.

16. Apparatus as recited in claim 15 and further comprising means connected to the output of said electronic channels to produce a signal which is proportional to the number of said sensor elements that are excited by incoming radiation;
multiplying means connected to said last mentioned summing means to multiply its output by a signal which is a measure of the instantaneous displacement of said aligned sensor elements from the image of said optical axis on said focal plane;
first integrating means for integrating the output of said last mentioned summing means;
second integrating means for integrating the output of said multiplying means;
dividing means for dividing the output of said second integrating means by the output of said first integrating means;
sample and hold means, timed to sample the output of said dividing means at the end of a predetermined portion of sweep of said field of view; and
means for resetting said integrating means immediately aafter the output of said dividing means has been sampled.

17. Apparatus as recited in claim 16 and further comprising:
second servo means, connected to be responsive to signals from said sample and hold means for servoing said telescope to reduce the outputs of said sample and hold means toward zero, thereby to cause the centroid of a target in said field of view to move toward coincidence with the optical axis of said telescope.

18. In an optical system, including a telescope having an optical axis substantially centered in the field of view thereof, and second and third axes forming an orthogonal set with said optical axis, the improvement comprising:
sensor means for sensing the distribution of a target image within the field of view of said telescope;
means for sensing the moments of said image relative to said second and third axes;
means for sensing the area of said image; and
means for dividing each of said moments by said area to produce signals which are a measure of the offset of the centroid of said target image.

19. Apparatus as recited in claim 18 and further comprising:
servo means, connected to receive signals from said dividing means and to move the optical axis of said telescope in response to said signal until said optical axis coincides with the centroid of said target.

20. In an optical system, including a telescope having an optical axis substantially centered in the field of view thereof, and second and third axes forming an orthogonal set with said optical axis, the improvement comprising:
sensor means for sensing the distribution of a target within the field of view of said telescope;
means for sensing the moment of said image relative to said second axis;
means for sensing the area of said image relative to said second axis; and
means for dividing said moment by said area to produce a signal which is a measure of the offset in the direction of said third axis from said second axis of the centroid of said target image.

21. A method of tracking the geometrical centroid of a signal defined target image sighted by an optical system including a telescope having an optical axis substantially centered in the field view thereof and having second and third axes forming an orthogonal set with said optical axis, said method comprising the steps of:

a. sensing the distribution of a target image within the field of view of said telescope;
b. sensing the moments of elements of said image relative to said second and third axes;
c. sensing the area of said image;
d. producing signals which are a measure of the offset of the centroid of said target image from said optical axis by dividing each of said moments by said area; and
e. servo controlling said telescope to move in a direction tending to reduce said offset signals to zero to thereby position said optical axis in alignment with the centroid of said target image.

* * * * *